Nov. 26, 1963 W. E. W. JACOB 3,112,367

ARRANGEMENT AT MULTI-CHANNEL PULSE COMMUNICATION SYSTEMS

Filed March 2, 1960

INVENTOR
WALTER EMIL WILHELM JACOB
BY Hane and Nydick
ATTORNEYS 3,112,367
Patented Nov. 26, 1963

3,112,367

ARRANGEMENT AT MULTI-CHANNEL PULSE COMMUNICATION SYSTEMS

Walter Emil Wilhelm Jacob, Hagersten, Sweden, assignor to Telefonaktiebolaget L M Ericsson, Stockholm, Sweden, a corporation of Sweden Filed Mar. 2, 1960, Ser. No. 12,301
Claims priority, application Sweden Mar. 13, 1959
5 Claims. (Cl. 179—15)

The present invention relates to multi-channel pulse communication systems, and in particular to electronic telephone systems.

There are known electronic telephone systems including a number of subscribers and line circuits which are divided into primary groups. All the subscribers are supplied through common transmission points in form of modulated pulses, which are mutually displaced in time. Between each subscriber and line and a corresponding connecting switch a low-pass filter is connected, the terminating condenser of which, turned to the switch, is connected to an inductance. This inductance is so dimensioned that together with the terminating capacitance of the low-pass filter it forms an oscillating circuit, the natural oscillating period of which is equal to double the pulse time. In this way a comparatively favourable curve form is obtained for the current pulse, which transfers energy from the sender to the receiver, and as a matter of fact the whole energy is transferred.

As a result of the ground and the leak capacitances the transmission way will, however, be capacitively loaded, and therefore the whole energy will not be transferred from the one subscriber to the other, but part of it will be used to charge the ground and leak capacitances. These losses can be avoided by connecting a capacitance auxiliary circuit between the common transmission medium and ground, and this circuit is then so dimensioned that together with the occurring ground and leak capacitances, the above mentioned inductances and terminating capacitances it forms a resonance circuit with a resonance frequency which is an even multiple of the resonance frequency of the above mentioned oscillating circuit.

In order to make this arrangement work it is necessary that the capacitance, which is connected to the common transmission medium, has the same size for the different connection possibilities, which is normally the case. Sometimes the connecting paths can diverge from the normal, e.g. when feeding of signals to a subscriber, or when an operator is listening in on the line to talk with one or both of the subscribers. In this case the tuning of the resonance circuit is altered, and therefore the capacitances of the transmission medium are not discharged at the end of the impulses.

The common transmission medium can include a number of transmission points, which are mutually connected with contacts, at which a connection between two signal places normally pass at least two primary and two secondary transmission points, while in special cases e.g. at signalling, it passes only one primary transmission point to a special signal place.

A form of embodiment of the invention in order to bring about a tuning in spite of the fact that the capacitance of the transmission medium varies for different connection alternatives, is characterized by the primary transmission points being allotted such a great part of the capacitive circuit that its capacitance inclusive the ground capacitance is equal to $$\frac{2C}{4(n+m)^2-1}$$

where $m$ is a whole number $>0$, the total capacitance of the transmission medium in the normal case being $$\frac{2C}{4n^2-1}$$

Another form of embodiment is characterized by the terminating capacitance C′ of the low-pass filter and the inductance of the choke L′ in the special signal place being equal to $$C'=[4(n+m)^2-1]Cp-C$$

where $m$ is a whole number $>0$, $Cp$ is the capacitance of the primary transmission point and C and L is the terminating capacitance of the low-pass filter and the inductance of the choke in the normal signal places provided that the total capacitance of the transmission medium in the normal case is $$\frac{2C}{4n^2-1}$$

The connection may even normally comprise $p$ signal places, which can temporarily be increased to $p+1$ by connection of an extra signal place.

A form of embodiment of the invention, which makes it possible to tune even in this case, is characterized by the terminating capacitance C″ of the low-pass filter and the inducance L″ of the choke fulfilling the conditions $$C''=\frac{4p\cdot C(m^2+2nm)}{4n^2-1}$$

$$L''=\frac{LC}{C''}$$

where $m$ is a whole number $>0$, and C and L is the terminating capacitance of the low-pass filter and the inductance of the choke in a normal signal place provided that the total capacitance of the transmission medium is $$\frac{p\cdot C}{4n^2-1}$$

The invention will be further described in connection with the enclosed figures, where:

Figure 1:
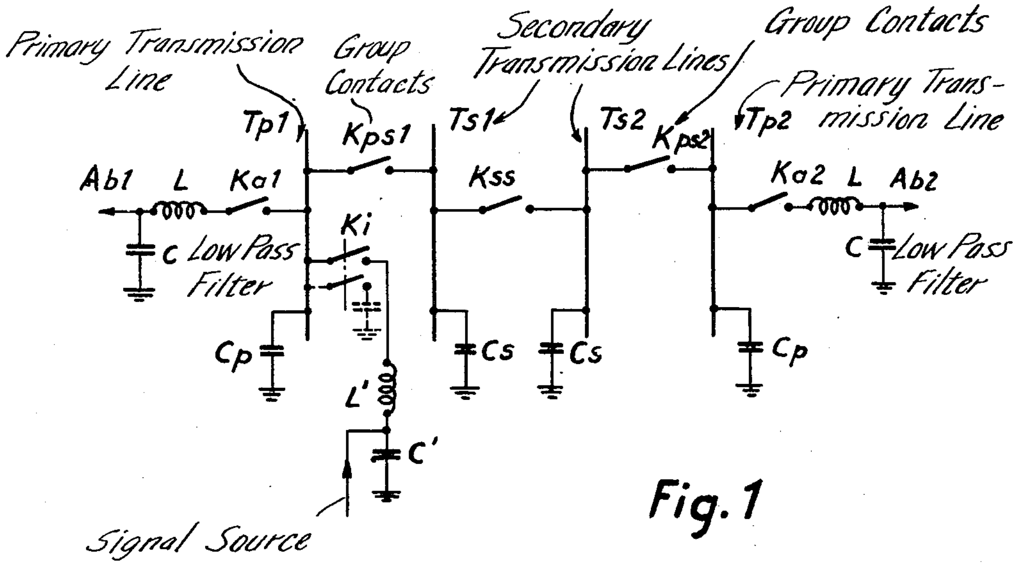
FIG. 1 shows as a principle the transmission paths at a pulse signal transmission system with primary and secondary transmission points and arrangements for feeding signals to the one subscriber.

In FIG. 1 $Ab1$ and $Ab2$ represent subscriber- or line equipments, which in a known way include a low-pass filter closest to the transmission system. The low-pass filter is terminated by a condenser C. Between every subscriber and the proper pulse transmission system an inductance L is connected. The inductances L together with the condensers C form an oscillating circuit with a natural oscillating period, which is equal to double the pulse time. Between the inductances L the proper pulse transmission system lies, and this consists of the subscriber contacts $Ka1$, $Ka2$, which connect the subscribers to a primary transmission line $Tp1$ and $Tp2$, the group contacts $Kps$, which respectively connect primary transmission lines with a secondary transmission line $Ts1$ and $Ts2$, and a group contact $Kss$, which connects the two secondary transmission lines $Ts1$ and $Ts2$ with each other. A connection between $Ab1$ and $Ab2$ is established over 2 subscriber contacts and 3 group contacts.

Each transmission line has a certain capacitance to ground, which is recharged by the pulse energy. If these capacitances have any energy left at the end of the pulses on one hand a damping of the signals is caused and on the other hand a distortion because the contacts are under tension in the breaking moment. In order to achieve that the capacitances are quite discharged at the end of the pulses the common transmission lines $Tp$, $Ts$ etc. are provided with auxiliary capacitances, so that the sum of the total ground capacitances of the transmission lines $2Cp+2Cs$ fill the following condition $$2Cp+2Cs=\frac{p\cdot C}{4n^2-1} \qquad (1)$$

where C is the capacitance of the condenser C, $p$ is the number of subscribers taking part in the communication and $n$ is a whole number $>0$. With this dimensioning the current through the ground capacitance gets a frequency, which is an even multiple $2n$ of the resonance frequency of the oscillating circuit formed by the condensers C and inductances L, and thus zero current flows at the end of the pulses. As the total ground capacitance decreases quadratically with $n$, only small values for $n$ practically comes in question. The mutual distribution among the capacitances $Cp$ and $Cs$ can vary, if only the sum of $Cp+Cs$ does not rise above $$\frac{p\cdot C}{4n^2-1}$$

In ordinary telephone systems it is necessary to be able to feed certain signals to a subscriber before the connection between two subscribers has been completed. A busy signal is for instance fed in a place which from the transmission technical point of view lies near to the called subscriber. This is made clear in FIG. 1, where a signal source is connected to the primary transmission line $T_p$ via a pulse network C'L' and a contact $Ki$. The signal source is connected to the transmission line $Tp1$ by the closing of the contact K1 in a time position, which has been given to $Ab1$, then only the contact $Ka1$ is closed, while the group contacts $Kps$ and $Kss$ are broken. In this case only the capacitance $Cp$ will load the transmission path between the subscriber $Ab1$ and the signal source, while the capacitance $2Cs$ and $Cp$ to the right of the contact $Kps$ do not contribute to the tuning and if the ground capacitances; which load the transmission path between the called subscriber and the signal source, do not satisfy the above mentioned rule of dimensioning, damping and distortion will arise as mentioned above.

In order to avoid these inconveniences it is of course possible with $C'=C$ to connect a capacitance of the size $2Cs+Cp$ in parallel with the capacitance $Cp$ of the transmission line $Tp1$ with help of a contact, which is synchronized with the contact $Ki$, which is marked with dotted lines in FIG. 1. This solution will, however, be rather complicated and requires several extra components.

A better solution according to the invention is to dimension the capacitances $Cp$ so that when the transmission path only passes the primary transmission line the current through the capacitance $Cp$ has a frequency which is twice the current through the total auxiliary capacitance $C_{tot}$ when the transmission path passes from $Ab1$ to $Ab2$ via two subscriber contacts and three group contacts. Generically if $C'=C$ and $L'=L$ $$C_{tot}=2Cp+2Cs=\frac{p\cdot C}{4n^2-1}$$

according to (1)

$$Cp=\frac{p\cdot C}{2(n+m)^2-1} \qquad (2)$$

$$Cs=\frac{1}{2}\,\frac{p\cdot C}{4n^2-1}-\frac{p\cdot C}{4(n+m)^2-1} \qquad (3)$$

is valid, where $m$ is a whole number $>0$, preferably 1 or 2.

As $(n+m)$ owing to the size of the ground capacitances cannot in general be larger than 2 or possibly 3, it is obtained for $n=1$, $m=1$ and $p=2$ the following dimensioning of the capacitances $Cp$ and $Cs$ $$Cp=\frac{2C}{15}$$

$$Cs=\frac{C}{5}$$

The ground capacitance is often larger at the primary transmission lines $Tp1$ and $Tp2$ than at the secondary transmission lines $Ts1$ and $Tx2$, owing to the fact that the number of subscriber contacts, which is much larger than the number of group contacts, are connected to a secondary transmission line. The leakage capacitances of the contacts, which capacitances are included in the total ground capacitance, often are non-linear, and therefore it may be desirable to have $Cp$ larger than $Cs$. This is used in another exemplary embodiment of the transmission system, which is called asymmetrical tuning. According to this embodiment the capacitance C' in the pulse network of the signal circuit has a value other than the capacitance C in the pulse network of the subscriber circuit. If in the normal transmission path the capacitances of all the networks are C, the total capacitance of the pulse network for the signal transmission path will be $C+C'$ instead of $p.C$. The expression for the auxiliary capacitance $Cp$ will then be $$Cp=\frac{C+C'}{4(n+m)^2-1} \qquad (4)$$

$Cp$ may now be chosen as desired, and then C' is obtained from the equation $$C'=[4(n+m)^2-1]Cp-C \qquad (5)$$

If $n$ chosen to 1, $m$ to 1

$$C'=15Cp-C$$

is obtained. If for instance it is desired to choose $Cp$ equal to ⅓ of the total auxiliary capacitance $$\frac{2C}{3}$$

for a normal connection over 2 subscriber- and 3 group contacts, the equation will be $$C'=15\cdot\frac{1}{3}\cdot\frac{2C}{3}-C=\frac{7C}{3}$$

In order for the resonance frequency in the circuit C—L—L'—C' to remain unchanged, the value of L' must of course be chosen so that $$\frac{L}{L'}=\frac{C'}{C}\text{ i.e. }L'=\frac{LC}{C'} \qquad (6)$$

For many applications the fed signal is intermittent (e.g. busy signal) and the impulsing of the signal is obtained by the contact not being periodically closed during the time intervals when a signal will not be sent to the subscriber. The subscriber contact is, however, periodically closed during the whole time when a connection is established between the subscriber and the station, and therefore no tuning of the transmission circuit is prevailing during the signal pauses. Therefore the following three cases must be taken into consideration so that the transmission circuit will always be tuned.

(1) The transmission circuit extends from $Ab1$ over $Ka1$ to $Tp1$.

(2) The transmission circuit extends from $Ab1$ over $Ka1$, $Tp1$ and $Ki$ to the signal circuit.

(3) The transmission circuit extends from $Ab1$ over $Ka1$, $Tp1$, $Kps1$, $Ts1$, $Kss$, $Ts2$, $Kps2$, $Tp2$ and $Ka2$ to $Ab2$.

$Cp=C_{tot}$ and $p=1$ tuning is obtained for case 1 by choosing $n=2$ in the Equation 1 at which $$Cp=\frac{C}{15}$$

In Case 2 it is necessary to choose an asymmetrical tuning and $n=3$ at which, according to Equation 5, $$C'=35Cp-C=\frac{4}{3}C$$

and $$L'=\frac{3}{4}L$$

In Case 3 the tuning is $$2Cs+2Cp=\frac{2C}{3}$$

Figure 2:
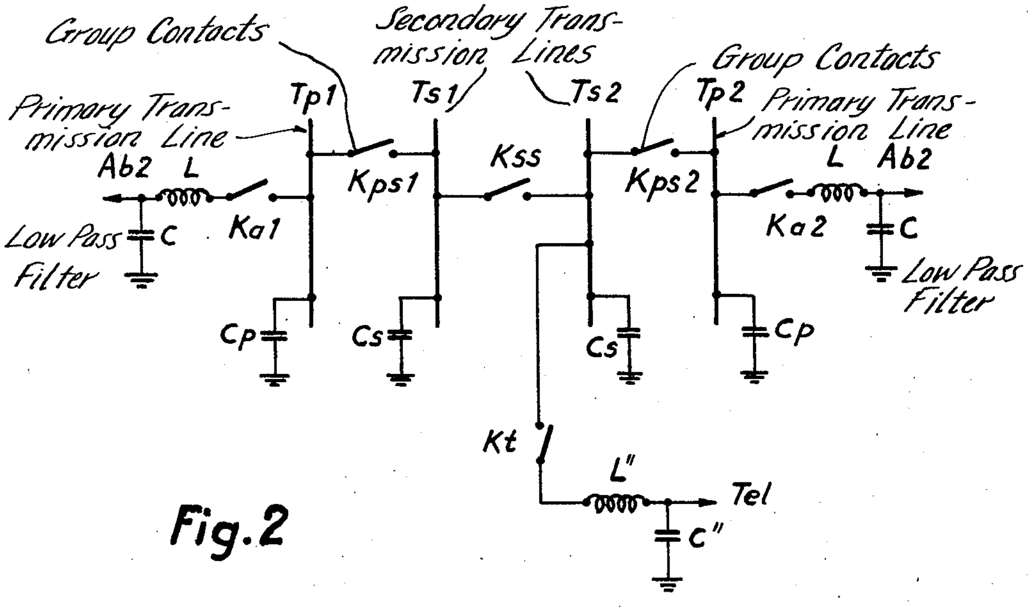
FIG. 2 shows as a principle how for instance an operator can break in upon existing connections in a pulse signal transmission system.

In a telephone system it is generally considered that two subscribers communicate with each other ($p=2$ in Equation 1). Sometimes, however, it is necessary for instance for an operator to listen in one the line, i.e. $p$ will be 3. FIG. 2 shows how the operator is connected into a transmission circuit between two subscribers $Ab1$ and $Ab2$ of the same kind, which is shown in FIG. 1. The same components are provided with the same notations.

The operator is connected via a pulse network $L''$, $C''$ and a contact to the common transmission line $Ts2$ but can also be connected to another transmission line. When the operator wishes to listen in on the line between the subscribers $Ab1$ and $Ab2$ the contact $Kt$ is closed synchronously with the contacts in the transmission path between $Ab1$ and $Ab2$.

Let it be assumed that:

$$2Cp+2Cs=\frac{p\cdot C}{4n^2-1}$$

which for $n=1$ and $p=2$ gets the value $$\frac{2C}{3}$$

When the operator is connected, the communication takes place between 3 circuits but the auxiliary capacitances are still the same. Thus, the current through the auxiliary capacitances will still pass through zero when the contacts are opened and the following relationship must be valid:

$$\frac{p\cdot C}{4n^2-1}=\frac{pC+C''}{4(n+m)^2-1}$$

$$C''=\frac{4\cdot p\cdot C(m^2+2nm)}{4n^2-1}$$

$$=\frac{8C(m^2+2nm)}{4n^2-1}$$

for $p=2$ $$L''=\frac{LC}{C''}$$

where $p$ and $n$ are valid for the normal transmission path.

If $p=2$, $n=1$, $m=1$ the result will be $$C''=8C$$

$$L''=\frac{1}{8}L$$

With this dimensioning the tuning is consequently maintained even when an operator is listening in on the line.

I claim:

1. In a time-multiplexing communication system wherein separate primary transmission lines are provided for first and second groups of subscribers and separate secondary transmission lines are connectable to said primary lines separately through switching means, respectively, and switching means are provided between said secondary lines for connecting said secondary lines together, each subscriber of said first and second groups being connectable separately to said primary lines through switching means and including an inductance in series with a shunt capacitor of a low-pass filter forming an oscillator circuit, the natural oscillation period of which is twice the pulse time during which all of the aforementioned switching means are closed for transmission between subscribers in each of said first and second groups, each of said primary lines having a total shunt capacitance represented by $Cp$ and each of said secondary lines having a total shunt capacitance represented by $Cs$, said total shunt capacitances being related to the equation $$2Cp+2Cs=\frac{p\cdot C}{4n^2-1}$$

to have said total shunt capacitances uncharged at the end of the pulse transmission periods, where C is the capacitance of the low-pass filter capacitance of a subscriber, $p$ is the number of subscribers of a group, and $n$ is a whole number greater than zero, in combination, comprising a signal-charging circuit for a subscriber of one of said first and second groups when said subscriber is connected to said primary line and said primary line is unconnected to a secondary line, said signal-charging circuit for subscribers of one of said first and second groups being connectable to one of said primary lines through switching means when said one primary line and one secondary line are unconnected, and said signal-charging circuit including an inductance and a capacitance in series therewith and with the total shunt capacitance $Cp$ of said connected primary line, and a signal source connected between said inductance and said capacitance, said shunt capacitance $Cp$ having a value selected according to the relationship $$Cp=\frac{C+C'}{4(n+m)^2-1}$$

to eliminate loading of said one primary line, where C is the capacitance of the low-pass filter of a subscriber, $C'$ is the capacitance of the charging circuit, $n$ is a whole number larger than zero, and $n+m$ is a whole number larger than $n$.

2. A time-multiplexing system as set forth in claim 1, wherein capacitance $C'$ is equal to shunt capacitance C and shunt capacitances $Cp$ are selected according to the relation $$Cp=\frac{2C}{4(n+m)^2-1}$$

3. A time-multiplexing system as set forth in claim 1, wherein $m$ is equal to $n+1$.

4. A time-multiplexing system as set forth in claim 1, wherein said capacitance $C'$ and the inductance $L'$ of said charging circuit are selected in accordance with the relation $$C'=[4(n+m)^2-1]\cdot Cp-C$$

$$L'=\frac{L\cdot C}{C'}$$

where L is the inductance and C is the capacitance of the subscriber to which the charging circuit is connected.

5. A time-multiplexing system as set forth in claim 1, including a pulse network connectable to one of said primary and secondary lines through switching means for receiving communication between subscribers in said first and second groups when said switching means connecting said subscriber to said primary lines and between said primary and secondary lines are closed, said network including an inductor $L''$ connected in series with a shunt capacitor C'', said inductance and said capacitance being selected in accordance with the relation $$C''=\frac{8C(m^2+2nm)}{4n^2-1}$$

$$L''=\frac{LC}{C''}$$

to prevent loading said one of said primary and secondary lines, where L and C are the inductance and capacitance of said subscriber oscillator circuits.

References Cited in the file of this patent

UNITED STATES PATENTS

| | | |
|---|---|---|
| 2,917,583 | Burton et al. | Dec. 15, 1959 |
| 2,962,551 | Johannesen | Nov. 29, 1960 |